(No Model.)
J. M. KEITH.
GATE FOR STOCK YARDS.
No. 510,511. Patented Dec. 12, 1893.
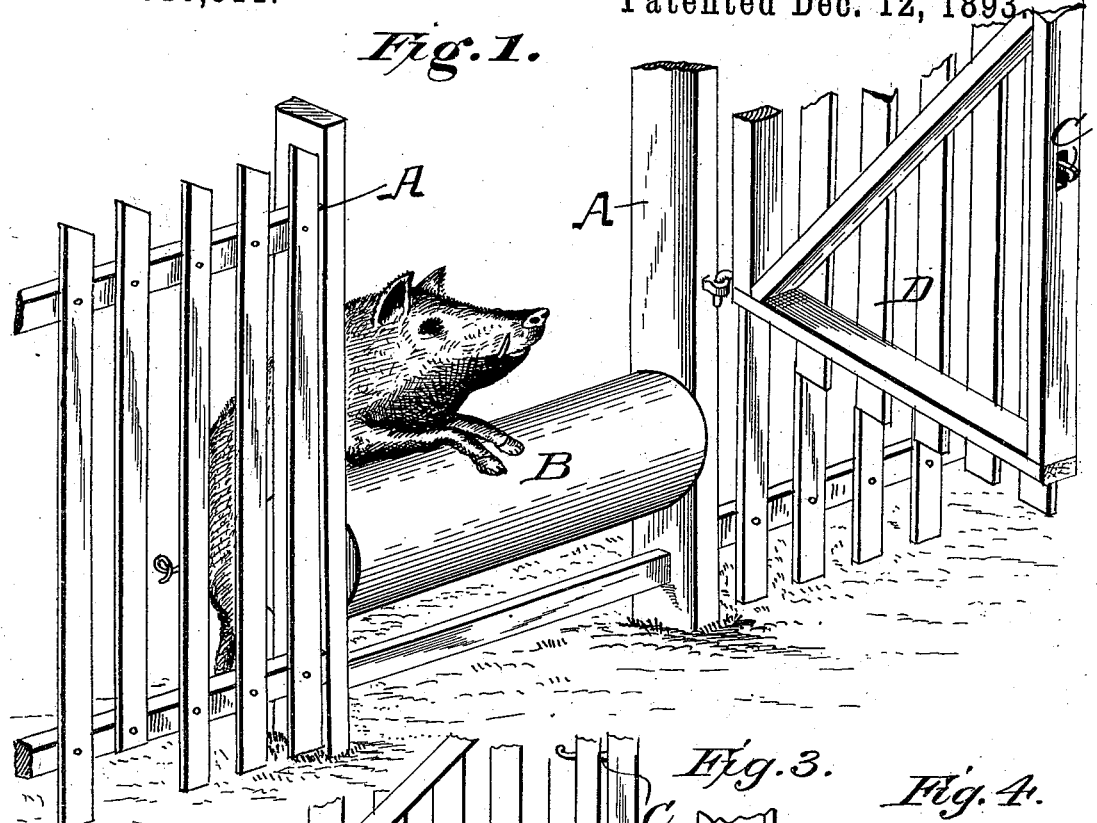
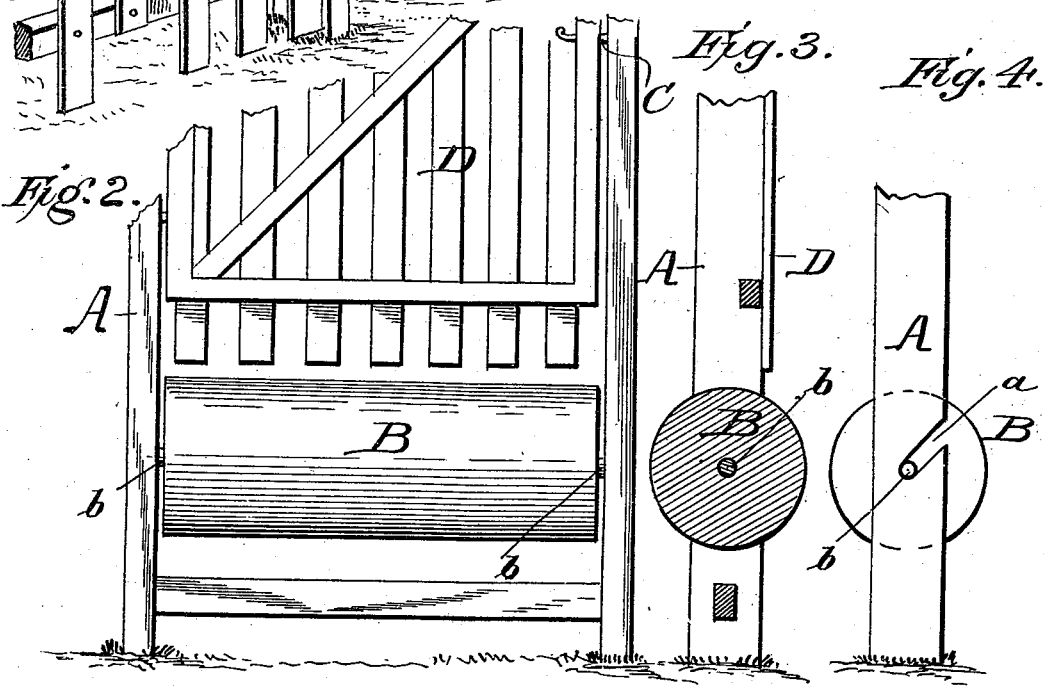
WITNESSES:
F. L. Ourand
R. J. Ray
INVENTOR:
Jesse M. Keith
by Louis Bagger & Co.
Attorneys.
THE NATIONAL LITHOGRAPHING COMPANY,
WASHINGTON, D. C.

UNITED STATES PATENT OFFICE.

JESSE M. KEITH, OF MURRAY, IOWA.

GATE FOR STOCK-YARDS.

SPECIFICATION forming part of Letters Patent No. 510,511, dated December 12, 1893.

Application filed April 24, 1893. Serial No. 471,686. (No model.)

*To all whom it may concern:*

Be it known that I, JESSE M. KEITH, a citizen of the United States, and a resident of Murray, in the county of Clarke and State of Iowa, have invented certain new and useful Improvements in Gates for Stock-Yards; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved gate, illustrating its operation. Fig. 2 is a front elevation of the gate, showing it closed. Fig. 3 is a vertical sectional view of the same; and Fig. 4 is side elevation of one of the gate posts with an end view of the roller, showing the latter as removable.

Like letters of reference denote corresponding parts in all the figures.

This invention relates to gates for use in stock-yards, barns, or feeding inclosures, and has for its object to provide a gate so constructed that it, when open, will permit the large stock or cattle (such as horses, mules, cows, &c.) to pass out of the gate only, while the small stock (such as sheep and hogs) cannot pass through the gate. Feeders of stock often experience much trouble in keeping the hogs back in the yard or close when a gate of the usual construction is opened to turn the large stock out, whereas they have little difficulty in keeping the large stock back in the yard when the hogs are turned out; and my aim is to overcome this difficulty by a gate of the peculiar construction which will be hereinafter more fully described and claimed.

Referring to the drawings, the letters A A denote the gate posts, which are about four feet high (above ground) and placed about three feet apart, so that horses, mules or cattle can easily pass between them. Between these posts, about eighteen or twenty inches from the ground, is journaled a roller, B, about eight or ten inches in diameter, and just above this is hung an ordinary swinging gate, D, provided with a latch, hook, or other fastening, C, of any desired construction, to be used when the gate is closed.

If it is desired to turn out the large stock only, but keep the sheep and hogs in the yard, gate D is swung open and the horses and cattle pass out by stepping over and across the roller B. But if some of the small stock—a hog, for example—attempts to pass through the gate, there is not room enough to pass under the roller, and in trying to get over the roller, this will revolve in its bearings when he puts his fore feet on it, so as to throw him back into the yard. It is important, therefore, that roller B should be of sufficient diameter (say about ten inches) to prevent a hog from reaching with his fore feet too far over or across the middle line or axis of the roller. Unless he does this, all attempts to get across the roller will be frustrated, as the roller will revolve every time the animal puts his fore feet upon it, so that he cannot possibly get a firm hold or bearing on it with his fore feet, which would enable him to jump across. Next to this gate, or at some other convenient point in the fence, may be located another gate of ordinary construction, to be used when all the stock, both large and small, is to be turned out; or the small stock alone may be turned out when desired by removing one of the lower bars or rails in the fence. Or, if desired, the bearings for the roller journals may be so constructed that the roller can easily be removed if the small stock as well as the large stock is to be turned out, to be replaced afterward. This can readily be done by making oblique recesses, $a$, in the gate posts or uprights A, as shown in Fig. 4, the inner end or bottom of said recesses forming the bearings or boxes for the roller journals $b$. It will be seen that by this construction the roller can be lifted out of its bearings and laid on the ground or on one side, while the small stock passes out, to be lifted up again and replaced at the proper time.

It will be obvious that instead of having the swinging gate D, a sliding or lifting gate may be used; or removable rails or bars may be substituted for the gate, if desired, without deviating from the spirit of my improvement, which consists in the combination with the closable outlet or egress of the journaled roller B.

Having thus described my invention, I claim and desire to secure by Letters Patent of the United States—

1. The combination of the gate posts A A, gate D, and roller B; substantially as and for the purpose shown and set forth.

2. The combination with the gate posts A A and gate D of the removable roller B, journaled between the posts; substantially as and for the purpose shown and set forth.

In testimony that I claim the foregoing as my own I have hereunto affixed my signature in presence of two witnesses.

JESSE M. KEITH.

Witnesses:
H. B. HERMANCE,
A. W. RIES.